United States Patent
Nagamitsu

(10) Patent No.: US 12,248,777 B2
(45) Date of Patent: Mar. 11, 2025

(54) CENTER, DISTRIBUTION CONTROL METHOD, AND NON-TRANSITORY STORAGE MEDIUM

(71) Applicant: TOYOTA JIDOSHA KABUSHIKI KAISHA, Toyota (JP)

(72) Inventor: Shoichi Nagamitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/512,291

(22) Filed: Nov. 17, 2023

(65) Prior Publication Data

US 2024/0086178 A1 Mar. 14, 2024

Related U.S. Application Data

(63) Continuation of application No. 17/697,154, filed on Mar. 17, 2022, now Pat. No. 11,947,951.

(30) Foreign Application Priority Data

Apr. 6, 2021 (JP) ................. 2021-064671

(51) Int. Cl.
*G06F 8/65* (2018.01)
*B60W 50/06* (2006.01)
(Continued)

(52) U.S. Cl.
CPC .............. *G06F 8/65* (2013.01); *B60W 50/06* (2013.01); *B60W 2556/45* (2020.02)

(58) Field of Classification Search
CPC ... G06F 8/65; G06F 8/658; G06F 8/71; G06F 8/64; B60W 50/06; B60W 2556/45; H04W 4/48; H04W 4/50; H04W 8/245; H04W 4/44; B60R 16/0239; B60R 16/0234; G07C 5/008; H04L 67/12; H04L 67/1097;
(Continued)

(56) References Cited

U.S. PATENT DOCUMENTS 8,072,354 B2 * 12/2011 Jeong ................. G01C 21/367
340/995.15
10,514,906 B2 12/2019 Fox
(Continued)

FOREIGN PATENT DOCUMENTS

| CN | 105302587 A | 2/2016 |
|---|---|---|
| CN | 112543915 A | 3/2021 |
| JP | 2018-181377 A | 11/2018 |

OTHER PUBLICATIONS

Jan. 17, 2024 Notice of Allowance issued in U.S. Appl. No. 17/697,154.
(Continued)

*Primary Examiner* — Thuy Dao
(74) *Attorney, Agent, or Firm* — Oliff PLC

(57) ABSTRACT

A center is configured to distribute, to a vehicle, update data of software of a control device mounted on the vehicle. The center includes one or more processors configured to make a determination on whether to distribute, as the update data, update software or difference data between current software and the update software based on first information on the software of the control device mounted on the vehicle. The center then transmits the determined update data to the vehicle.

12 Claims, 11 Drawing Sheets

(51) Int. Cl.
*G06F 8/60* (2018.01)
*G06F 8/61* (2018.01)
*G06F 9/445* (2018.01)
*H04L 29/08* (2006.01)
*H04W 8/24* (2009.01)

(58) Field of Classification Search
CPC ..... H04L 67/34; G01R 31/367; G01R 31/387; G01R 31/3647
See application file for complete search history.

(56) References Cited

U.S. PATENT DOCUMENTS

| | | |
|---|---|---|
| 11,354,112 B2* | 6/2022 | Noda .................. G06F 8/65 |
| 11,422,794 B2 | 8/2022 | Fox |
| 2003/0115295 A1* | 6/2003 | Potts, Jr. .............. H04L 67/06 709/219 |
| 2019/0265965 A1* | 8/2019 | Acharya ............... H04L 12/40 |
| 2020/0057630 A1* | 2/2020 | Cho ..................... G06F 8/65 |
| 2021/0157572 A1 | 5/2021 | Harata et al. |

OTHER PUBLICATIONS

Sarwar et al., Network of ECUs Software Update in Future vehicles, 5 pages (Year: 2019).

Aug. 18, 2023 Notice of Allowance issued in U.S. Appl. No. 17/697,154.

\* cited by examiner

FIG. 6

UPDATE MANAGEMENT INFORMATION <VEHICLE ID_AB01>

| ECU-A | ECU-B | ECU-C | EDU-D | ECU-E | ... |
|-------|-------|-------|-------|-------|-----|
| 4.0   | 4.0   | 4.0   | 5.0   | 3.0   | ... |

FIG. 7A

DIFFERENCE DATA PACKAGE <VEHICLE ID_AB01>

|   | PACKAGE | ECU-A | ECU-B | ECU-C | EDU-D | ECU-E | ... | SIZE   |
|---|---------|-------|-------|-------|-------|-------|-----|--------|
| 1 | 1.0     | 1.0   | 1.0   | 1.0   | 1.0   | 1.0   | ... | 2000MB |
| 2 | 2.0     | –     | –     | –     | 2.0   | 2.0   | ... | 150MB  |
| 3 | 3.0     | 2.0   | 2.0   | 2.0   | –     | –     | ... | 200MB  |
| 4 | 4.0     | –     | –     | –     | 3.0   | –     | ... | 100MB  |
| 5 | 5.0     | 3.0   | 3.0   | 3.0   | 4.0   | 3.0   | ... | 190MB  |
| 6 | 6.0     | 4.0   | 4.0   | 4.0   | 5.0   | –     | ... | 210MB  |

FIG. 7B

TOTAL DATA PACKAGE <VEHICLE ID_AB01>

| PACKAGE SOFTWARE | VERSION | SIZE |
|---|---|---|
| ECU-A | 1.0 | 500MB |
| ECU-A | 2.0 | 600MB |
| ... | ... | ... |
| ECU-A | 4.0 | 650MB |
| ECU-B | 1.0 | 400MB |
| ... | ... | ... |
| EDU-D | 1.0 | 500MB |
| EDU-D | 2.0 | 510MB |
| EDU-D | 3.0 | 520MB |
| EDU-D | 4.0 | 500MB |
| EDU-D | 5.0 | 540MB |
| ... | ... | ... |
| EDU-E | 3.0 | 600MB |

CENTER, DISTRIBUTION CONTROL METHOD, AND NON-TRANSITORY STORAGE MEDIUM

CROSS-REFERENCE TO RELATED APPLICATION

This application is a Continuation of U.S. patent application Ser. No. 17/697,154 filed on Mar. 17, 2022, which claims priority to Japanese Patent Application No. 2021-064671 filed on Apr. 6, 2021. The entire contents of the above applications are expressly incorporated by reference herein.

BACKGROUND

1. Technical Field

The present disclosure relates to a center, a distribution control method, and a non-transitory storage medium.

2. Description of Related Art

A plurality of electronic control units (ECU) used for controlling an operation of a vehicle is mounted on a vehicle. The ECU includes a processor, a non-transitory storage unit, such as a random access memory (RAM), and a non-volatile storage unit, such as a flash read-only memory (ROM). A control function of the ECU is implemented when the processor executes software stored in the storage unit. Software stored in each ECU is rewritable, and by updating the software to a newer version, it is possible to improve a function of each ECU or add a new vehicle control function.

As a technology for updating software of an ECU, an over-the-air (OTA) technology is well-known. In the OTA technology, an apparatus that wirelessly connects an in-vehicle communication device connected to an in-vehicle network to a communication network, such as the Internet, and executes software update processing of the vehicle updates or adds the software of the ECU by downloading software from a center functioning as a server via wireless communication and installing the downloaded software on the ECU.

Software update processing using an OTA technology can be started when an OTA master, which is an apparatus that executes software update processing of the vehicle, transmits information (an update confirmation) on a software version of an ECU to a center at a time at which a power supply or an ignition of the vehicle is turned on via an in-vehicle communication device (see, for example, Japanese Unexamined Patent Application Publication No. 2018-181377). Upon downloading update data from the center by the OTA, the OTA master notifies a user of a fact that the update data exists by displaying the fact on a display device and the like in a vehicle, and, upon receiving an approval of the user by an operation of an input device, such as a button, the OTA master installs and activates the update data.

SUMMARY

Some control functions, such as autonomous driving, provided in a vehicle are implemented by cooperative operations of a plurality of ECUs (or actuators). In order for the autonomous driving to normally function, software of a plurality of ECUs which implement the autonomous driving and of which the control functions need to be consistent with each other. When a function of the software of any one of the ECUs that implement the autonomous driving is updated, together with the updating of the function, functions of pieces of the software of other ECUs that implement the autonomous driving also need to be updated. The pieces of software of the plurality of ECUs of which the control functions need to be consistent with each other are usually updated as a set. Further, in order to reduce an amount of data transmitted from a center to the vehicle, software update data is provided as difference data before and after the updating. In other words, the pieces of software of the plurality of ECUs of which the control functions need to be consistent with each other are registered in the center in a form of a distribution package containing the difference data of each piece of software. The distribution package has a specification by which the distribution package cannot be opened at the center to prevent software tampering and the like, and thus it is difficult to extract only one piece of software update data from the distribution package.

When an ECU is replaced due to a failure and the like, a software version of the ECU may be changed before and after the replacement. When the replacement ECU is one of the plurality of ECUs of which the control functions need to be consistent with each other so as to implement the autonomous driving function, software of the replacement ECU needs to be updated to a latest state by downloading the update data registered as the distribution package containing the difference data. However, when the software version of the ECU after the replacement is significantly different from a latest software version, downloading of the distribution package containing the difference data, installing and activating using the distribution package containing the difference data, processing for requesting the user's approval, or the like are repeated many times, which may worsen efficiency of a software update.

The present disclosure provides a center, a distribution control method, and a non-transitory storage medium that can restrict worsening of efficiency of update processing in software update processing of a plurality of ECUs of which control functions need to be consistent with each other.

A center according to a first aspect of the present disclosure is configured to distribute, to a vehicle including a plurality of electronic control units, software update data for at least one of the electronic control units. The center includes: a storage device that stores update management information including a combination of latest versions of pieces of software of a plurality of first electronic control units of which control functions need to be consistent with each other, the first electronic control units being included in the electronic control units; and one or more processors configured to receive current versions of pieces of software of the electronic control units from the vehicle, determine, based on the update management information stored in the storage device and the received current versions of the pieces of software, whether at least one of the pieces of software of the first electronic control units needs to be updated, when determining that at least one of the pieces of software of the first electronic control units needs to be updated, decide any one of a first difference package and a first total data package as a distribution package based on one or more pieces of software of the first electronic control units that need to be updated, the first difference package containing difference data between a previous version and a latest version each of all pieces of software of the first electronic control units, and the first total data package containing total data of the latest version each of the one or more pieces of software of the first electronic control units that need to be updated, and transmit, based on a request from the vehicle, the decided distribution package to the vehicle.

A distribution control method according to a second aspect of the present disclosure is executed by a computer of a center. The center includes a processor, a memory, and a storage device, and being configured to distribute software update data for an electronic control unit to a vehicle including a plurality of electronic control units. The distribution control method includes: storing update management information including a combination of latest versions of pieces of software of a plurality of first electronic control units of which control functions need to be consistent with each other, the first electronic control units being included in the electronic control units; receiving current versions of pieces of software of the electronic control units from the vehicle; determining, based on the update management information and the received current versions of the pieces of software, whether at least one of the pieces of software of the first electronic control units needs to be updated; when determining that at least one of the pieces of software of the first electronic control units needs to be updated, deciding any one of a first difference package and a first total data package as a distribution package based on one or more pieces of software of the first electronic control units that need to be updated, the first difference package containing difference data between a previous version and a latest version each of all pieces of software of the first electronic control units, and the first total data package containing total data of the latest version each of the one or more pieces of software of the first electronic control units that need to be updated; and transmitting, based on a request from the vehicle, the decided distribution package to the vehicle.

A non-transitory storage medium according to a third aspect of the present disclosure stores a distribution control program that is executable by a computer of a center and causes the computer to execute functions. The center including a processor, a memory, and a storage device, and being configured to distribute software update data for an electronic control unit to a vehicle including a plurality of electronic control units. The functions includes: storing update management information including a combination of latest versions of pieces of software of a plurality of first electronic control units of which control functions need to be consistent with each other, the first electronic control units being included in the electronic control units; receiving current versions of pieces of software of the electronic control units from the vehicle; determining, based on the update management information and the received current versions of the pieces of software, whether at least one of the pieces of software of the first electronic control units needs to be updated; when determining that at least one of the pieces of software of the first electronic control units needs to be updated, deciding any one of a first difference package and a first total data package as a distribution package based on one or more pieces of software of the first electronic control units that need to be updated, the first difference package containing difference data between a previous version and a latest version each of all pieces of software of the first electronic control units, and the first total data package containing total data of the latest version each of the one or more pieces of software of the first electronic control units that need to be updated; and transmitting, based on a request from the vehicle, the decided distribution package to the vehicle.

With each aspect of the present disclosure, a determination is made, based on software that needs to be updated, on which of a package containing a difference data between versions or a package containing total data of latest versions is to be distributed, and thus it is possible to restrict worsening of efficiency of software update processing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is an example of update management information stored in the center;

FIG. 7A is an example of packaged difference data stored in the center;

FIG. 7B is an example of packaged total data stored in the center;

DETAILED DESCRIPTION OF EMBODIMENTS

A center according to the present disclosure decides whether to distribute a package containing difference data between software versions or a package containing total data of a latest version of software based on software that needs to be updated when the center distributes software update data for an ECU of a vehicle. Using this update data distribution package determination method, worsening of efficiency of software update processing is restricted. Hereinafter, one embodiment of the present disclosure will be described in detail with reference to drawings.

Embodiments

System Configuration

Figure 1:
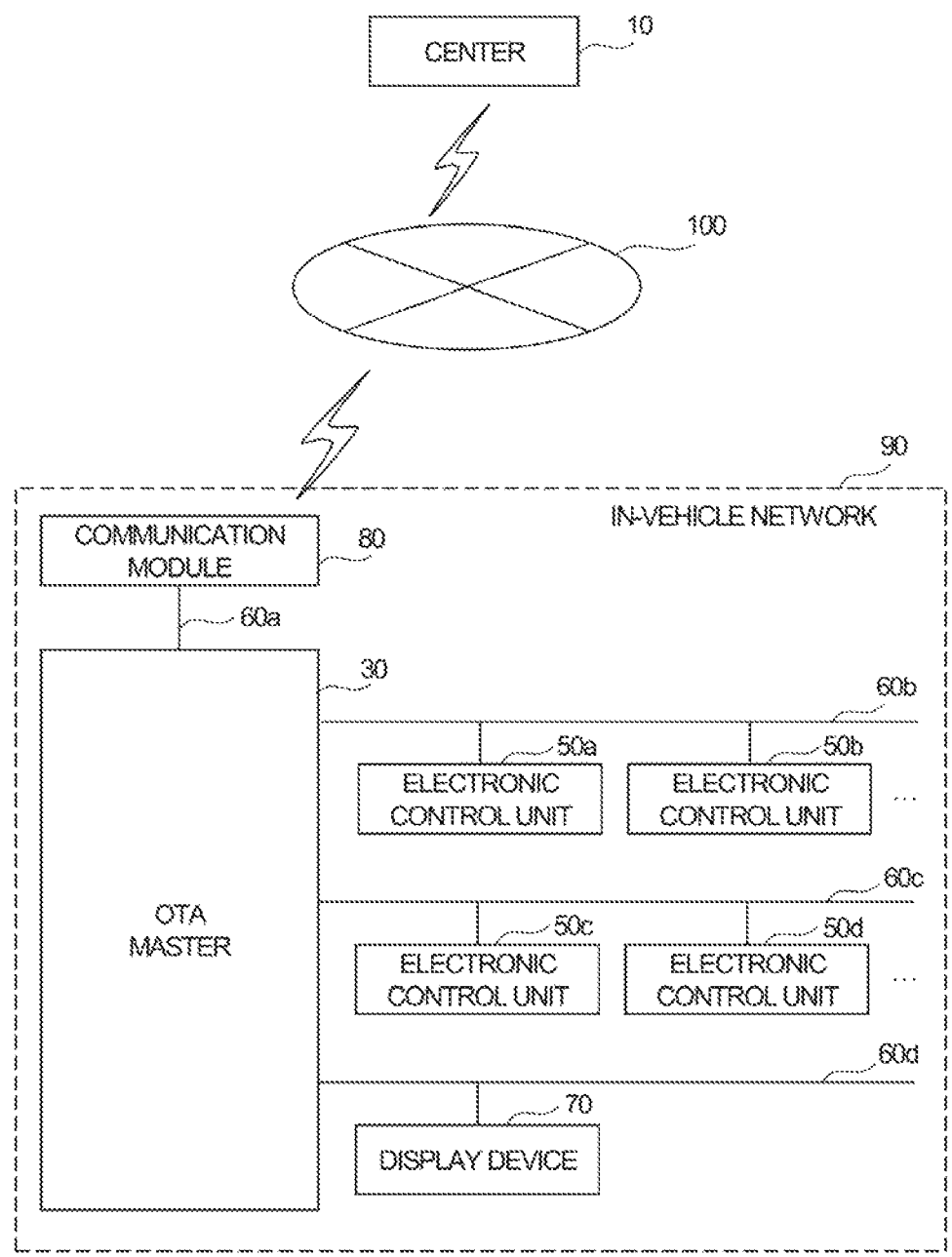
FIG. 1 is a block diagram illustrating an entire configuration of a network system according to an embodiment.

FIG. 1 is a block diagram illustrating an entire configuration of a network system according to an embodiment of the present disclosure. The network system illustrated in FIG. 1 is a system used for updating pieces of software of a plurality of ECUs 50a to 50d mounted on a vehicle, and includes a center 10 outside the vehicle and an in-vehicle network 90 constructed in the vehicle.

(1) Center

The center 10 can communicate with an OTA master 30, described below, included in the in-vehicle network 90 via a network 100, and can manage a software update for the ECUs 50a to 50d connected to the OTA master 30 by transmitting update data for the ECUs 50a to 50d and receiving a notification indicating a progress situation of the software update processing. The center 10 functions as a so-called server.

Figure 2:
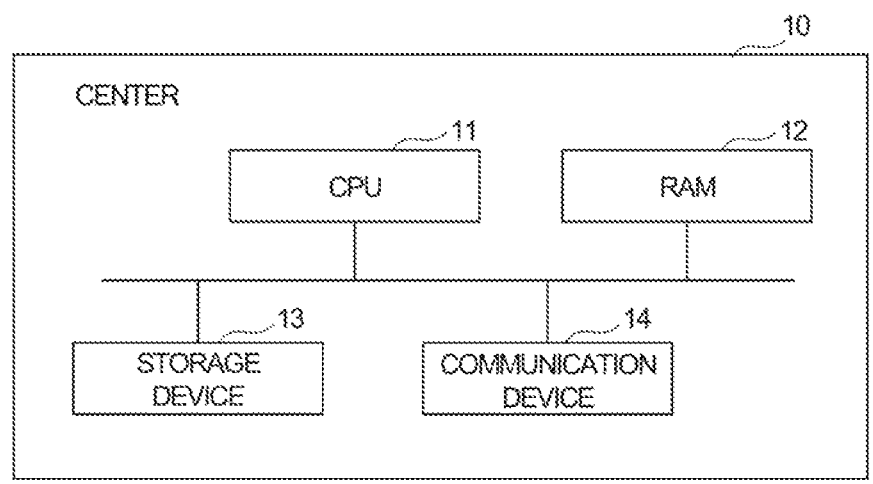
FIG. 2 is a block diagram illustrating a schematic configuration of a center.

FIG. 2 is a block diagram illustrating a schematic configuration of the center 10 in FIG. 1. As illustrated in FIG. 2, the center 10 includes a central processing unit (CPU) 11, a RANI 12, a storage device 13, and a communication device 14. The storage device 13 includes a readable and writable storage medium, such as a hard disk drive (HDD) or a solid state drive (SSD), and stores a program used for executing software update management, information used for the software update management, update data for each ECU, and the like. At the center 10, the CPU 11 executes predetermined processing for the software update by executing a program read from the storage device 13 using the RAM 12 as a work area. The number of the CPU 11 is not limited to one. The communication device 14 is used for communicating with the OTA master 30 via the network 100.

Figure 3:
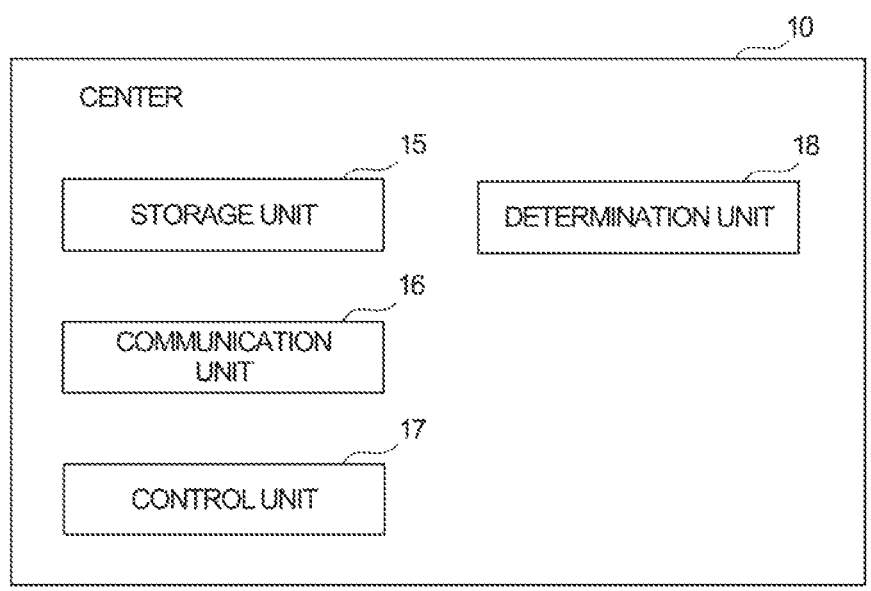
FIG. 3 is a functional block diagram of the center.

FIG. 3 is a functional block diagram of the center 10 illustrated in FIG. 2. The center 10 illustrated in FIG. 3 includes a storage unit 15, a communication unit 16, a control unit 17, and a determination unit 18. The storage unit 15 is implemented by the storage device 13 illustrated in FIG. 2. The communication unit 16, the control unit 17, and the determination unit 18 are implemented when the CPU 11 illustrated in FIG. 2 executes a program stored in the storage device 13 using the RAM 12.

The storage unit 15 stores information on the software update processing of one or more ECUs 50a to 50d mounted on the vehicle. As the information on the software update processing, the storage unit 15 stores update management information that associates information indicating software that can be used by the ECUs 50a to 50d with each piece of vehicle identification information (a vehicle ID) that identifies a vehicle, and at least the software update data for the ECUs 50a to 50d. Further, as the information on the software update processing, the storage unit 15 stores an update status indicating an update state of the software executed in the vehicle.

In the vehicle management information stored in the storage unit 15, as information indicating software usable in the ECUs 50a to 50d, for a plurality of ECUs of which control functions need to be consistent with each other (hereinafter, referred to as "first ECUs"), a combination of latest versions of pieces of software of the plurality of the first ECUs is defined. Further, as information indicating software usable in the ECUs 50a to 50d, for ECUs of which control functions do not need to be consistent with each other (hereinafter, referred to as "second ECUs"), latest versions of pieces of software of the second ECUs are stored. FIG. 6 illustrates an example of the vehicle management information. In FIG. 6, in a vehicle having a vehicle ID of "AB01", ECU-A, ECU-B, and ECU-C are first ECUs of which the control functions need to be consistent with each other, and all versions of pieces of software of these first ECUs, which are 4.0, is defined as a combination of latest versions. Further, the latest version of the ECU-D, which is 5.0, and the latest version of the ECU-E, which is 3.0 are stored. The vehicle management information may be stored as one piece of information by mixing the first ECUs with the second ECUs as illustrated in FIG. 6 or as two pieces of information by separating information on the first ECUs from information on the second ECUs.

As the update data stored in the storage unit 15, difference data between software versions each of the ECUs and total data of the latest software version of the ECU can be exemplified. The difference data is generated by packaging all pieces of software of the first ECUs into at least one package. An example of the packaged difference data is illustrated in FIG. 7A. In the example of FIG. 7A, as difference data packages for the vehicle ID_AB01, six packages (1.0 to 6.0) are prepared. The package 1.0 includes difference data for updating software of each of ECU-A, ECU-B, ECU-C. ECU-D, and ECU-E from version 0 to version 1.0. Since version 0 means that software itself does not exist, the difference data of the package 1.0 corresponds to all software data. A size (a data amount) of the update data in the package 1.0 is stated as 2000 MB. Further, the package 2.0 includes difference data for updating software of each of ECU-D and ECU-E from version 1.0 to version 2.0. Since no software version update by the package 2.0 exists for ECU-A, ECU-B, and ECU-C, the difference data of the software of these ECUs is not included in the package 2.0. A size (a data amount) of the update data in the package 2.0 is stated as 150 MB. In the same manner, the difference data of software version update by each of packages 3.0 to 6.0 exists for each ECU is also included. In this difference data package, the pieces of software of the first ECUs of which the control functions need to be consistent with each other are included in the same package, and a combination of the software of the first ECUs and the software of the second ECUs is not particularly limited.

Further, FIG. 7B illustrates an example in which each of total data of the software of the ECUs is packaged. In the example of FIG. 7B, as difference data packages for the vehicle ID_AB01, a plurality of packages is prepared. For example, total data of the software of each of the versions 1.0 to 5.0 is prepared for ECU-D, and the size (the data amount) of the update data is illustrated for each package. The storage unit 15 does not have to store packages of total data of all versions, and may store a part of the package, such as only the latest version, according to a storage capacity of the storage unit 15 or a frequency of use of the version. Although FIG. 7B illustrates an example in which total data of a single software is used as one package, total data of a plurality of pieces of software may be used as one package. For example, for the software of ECU-A, total data of version 1.0 and total data of version 2.0 may be used as one package, and total data of version 5.0 of software of ECU-C and total data of version 3.0 of software of ECU-E may be used as one package.

The communication unit 16 functions as a transmission unit and a receiving unit that transmits and receives data, information, requests, and the like, to and from the OTA master 30. The communication unit 16 receives a software update confirmation request from the OTA master 30 (the receiving unit). The update confirmation request may be, for example, information transmitted from the OTA master 30 to the center 10 at a time when a power supply or an ignition is turned on (hereinafter, referred to as "power ON") in the vehicle, and is information for requesting the center 10 to confirm whether update data for the ECUs 50a to 50d exists based on vehicle configuration information described below. Further, the communication unit 16 transmits information indicating the presence/absence of the update data to the OTA master 30 in response to the update confirmation request received from the OTA master 30 (the transmission unit). Further, the communication unit 16 receives a transmission request (a download request) for the distribution package from the OTA master 30 (the receiving unit). Further, upon receiving the download request for the distribution package, the communication unit 16 transmits the distribution package decided by the control unit 17, which will be described below, to the OTA master 30 based on the software of the ECU that needs to be updated (the transmission unit).

The determination unit 18 acquires the version of the present (the current version) of each piece of software of the plurality of ECUs 50a to 50d mounted on the vehicle specified by the vehicle ID from the vehicle configuration information included in the update confirmation request received by the communication unit 16. Then, the determination unit 18 determines whether the software of at least one ECU needs to be updated based on the update management information stored in the storage unit 15 and the current version of each piece of software received by the vehicle. More specifically, a determination is made on whether the current version of each piece of software acquired from the vehicle matches the latest version of each piece of software in the vehicle managed by the center 10 as the vehicle management information.

When the determination unit 18 determines that the software of at least one ECU needs to be updated, the control unit 17 determines whether software update data that needs to be updated exists based on the information on the software update processing stored in the storage unit 15. The determination result of whether the update data exists by the control unit 17 is transmitted to the OTA master 30 by the communication unit 16. Then, upon determining that the update data of the software of the ECUs 50a to 50d that needs to be updated exists and receiving the download request for the distribution package from the OTA master 30, the control unit 17 decides the distribution package transmitted to the vehicle as the update data based on the software of the ECU that needs to be updated. The method of deciding the distribution package will be described below.

(2) In-Vehicle Network

The in-vehicle network 90 includes the OTA master 30 the plurality of ECUs 50a to 50d, a display device 70, and a communication module 80. The OTA master 30 and the communication module 80 are connected to each other via a bus 60a. The OTA master 30 and the ECUs 50a, Sob are connected via a bus 60b. The OTA master 30 and the ECUs 50c, 50d are connected via a bus 60c. The OTA master 30 and the display device 70 are connected to each other via a bus 60d.

The OTA master 30 can wirelessly communicate with the center 10 via the network 100 via the bus 60a and the communication module 80. Further, the OTA master 30 can communicate with the ECUs 50a to 50d and the display device 70 in a wired manner via the buses 60b to 60d. The OTA master 30 is a device having a function of managing an OTA state, controlling a software update sequence, and updating the software of the ECU to be updated (hereinafter, referred to as a "target ECU"), and controls the software update of the target ECU from among the ECUs 50a to 50d based on the update data, and the like, acquired from the center 10 by communication. The OTA master 30 may also be referred to as a central gateway (CGW).

Figure 4:
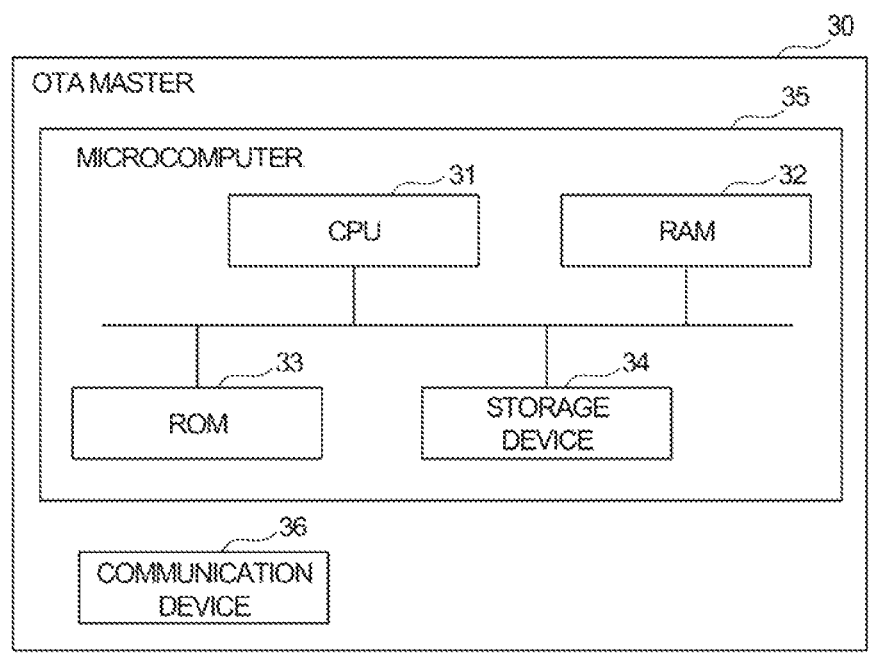
FIG. 4 is a block diagram illustrating a schematic configuration of an (HA master.

FIG. 4 is a block diagram illustrating a schematic configuration of the OTA master 30 in FIG. 1. As illustrated in FIG. 4, the OTA master 30 includes a CPU 31, a RAM 32, a ROM 33, a storage device 34, and a communication device 36, The CPU 31, the RAM 32, the ROM 33, and the storage device 34 compose a microcomputer 35. In the OTA master 30, the CPU 31 executes predetermined processing for the software update by executing a program read from the ROM 33 using the RAM 32 as a work area. The number of the CPU 31 is not limited to one. The communication device 36 is used for communicating with the communication module 80, the ECUs 50a to 50d, and the display device 70 via the buses 60a to 60d illustrated in FIG. 1.

Figure 5:
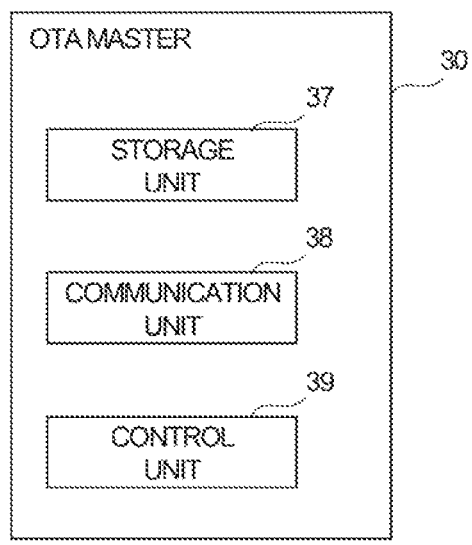
FIG. 5 is a functional block diagram of the OTA master.

FIG. 5 is a functional block diagram of the OTA master 30 illustrated in FIG. 4. The OTA master 30 illustrated in FIG. 5 includes a storage unit 37, a communication unit 38, and a control unit 39. The storage unit 37 is implemented by the storage device 34 illustrated in FIG. 4. The communication unit 38 and the control unit 39 are implemented when the CPU 31 illustrated in FIG. 4 executes a program stored in the ROM 33 using the RAM 32.

In addition to a program for updating the pieces of software of the plurality of ECUs 50a to 50d (a control program of the OTA master 30) or various pieces of data used when updating the pieces of software, the storage unit 37 stores the software update data downloaded from the center 10 by the distribution package.

The communication unit 38 functions as a transmission unit and a receiving unit that transmits and receives data, information, requests, and the like to and from the center 10. The communication unit 38 transmits the software update confirmation request to the center 10 at, for example, the time of power ON of the vehicle (the transmission unit). The update confirmation request includes, for example, a vehicle ID for identifying the vehicle and the information on the current versions of the pieces of software of the ECUs 50a to 50d connected to the in-vehicle network 90. The vehicle ID and the current versions of the pieces of the software of the ECUs 50a to 50d are used for determining whether the update data of the software of the ECUs 50a to 50d exists and, when the update data exists, which distribution package to employ, in comparison with the latest software version stored by the center 10 for each vehicle ID. Further, as a response to the update confirmation request, the communication unit 38 receives a notification indicating the presence/absence of update data from the center 10 (the receiving unit). When the software update data for the ECUs 50a to 50d exists, the communication unit 38 transmits a download request for the distribution package containing the update data to the center 10 (the transmission unit), and receives (downloads) the distribution package transmitted from the center 10 (the receiving unit). Further, the communication unit 38 transmits the update state of the software transmitted by the ECUs 50a to 50d to the center 10 (the transmission unit).

The control unit 39 determines whether the software update data for the ECU 50a to 50d exists based on the response from the center 10 to the update confirmation request received by the communication unit 38. Further, the control unit 39 verifies authenticity of the distribution package received (downloaded) from the center 10 by the communication unit 38 and stored in the storage unit 37. Further, the control unit 39 controls the update processing (installation, activation) of the pieces of the software of the ECUs 50a to 50d using the update data received (downloaded) from the center 10. Specifically, the control unit 39 transfers one or more pieces of update data downloaded in the distribution package to the target ECU and causes the target ECU to install the update software based on the update data. After the completion of the installation, the control unit 39 gives an instruction to the target ECU on activation that makes the installed update software effective.

The ECUs 50a to 50d are devices used for controlling the operation of each part of the vehicle. In FIG. 1, four ECUs 50a to 50d are illustrated, but the number of ECUs is not particularly limited. Further, the number of buses connecting the ECU to the OTA master 30 is not particularly limited, either.

The display device 70 is a human-machine interface (HMI) used for executing various displays, such as a display representing that the update data exists at the time of executing the software update processing of the ECUs 50a to 50d, a display of an approval request screen for requesting approval for the software update from a user or a manager of the vehicle, and a display of a result of the software update. As the display device 70, a display device of a car navigation system can be typically used, but the display device 70 is not particularly limited as long as it can display information needed for the software update processing. In addition to the display device 70, an ECU and the like may be further connected to the bus 60d illustrated in FIG. 1.

The communication module 80 is a unit having a function of controlling communication between the center 10 and the vehicle, and is a communication device used for connecting the in-vehicle network 90 to the center 10. The communication module 80 is wirelessly connected to the center 10 via the network 100, and the OTA master 30 executes vehicle authentication, downloading of the update data, or the like. The communication module 80 may be included in the OTA master 30.

Overview of Software Update Processing

The OTA master 30 transmits the software update confirmation request to the center 10 at, for example, the time of power ON of the vehicle. The update confirmation request includes, for example, a vehicle ID for identifying the vehicle and the vehicle configuration information, which is information on the state (the system configuration) of the ECUs, such as the current versions of the pieces of hardware and software of the ECUs 50a to 50d connected to the in-vehicle network 90, and the like. The vehicle configuration information can be generated by acquiring an identification number (ECU_ID) of the ECU and the identification number (ECU_Software_ID) of the software version of the ECU from the ECUs 50a to 50d connected to the in-vehicle network 90. The vehicle and the current versions of the pieces of software of the ECUs 50a to 50d are used for determining whether the software update data for the ECUs 50a to 50d exists in comparison with the latest software version held by the center 10 for each vehicle ID. Further, as a response to the update confirmation request, the OTA master 30 receives the notification indicating the presence/ absence of update data from the center 10, When the software update data for the ECUs 50a to 50d exists, the OTA master 30 transmits a download request for the distribution package to the center 10 and receives the distribution package transmitted from the center 10. In addition to the update data, the distribution package may include verification data for verifying the authenticity of the update data, the number of pieces of update data, installation order, activation order, type information, various pieces of control information used at a time of the software update, or the like.

The OTA master 30 determines whether the software update data for the ECUs 50a to 50d exists based on the response from the center 10 to the received update confirmation request. Further, the OTA master 30 verifies the authenticity of the distribution package received from the center 10 and stored in the storage device 13. Further, the OTA master 30 transfers one or more pieces of update data downloaded in the distribution package to the target ECU and causes the target ECU to install the update software. After the completion of the installation, the OTA master 30 instructs the target ECU to make the installed updated version software effective.

In the approval request processing, the OTA master 30 causes an output device to output a notification indicating that the approval for the software update is needed or a notification prompting an input indicating that the software update has been approved. As the output device, a display device 70 provided in the in-vehicle network 90, a voice output device that outputs a notification by voice, or the like, can be used. For example, in the approval request processing, when the display device 70 is used as the output device, the OTA master 30 can cause the display device 70 to display an approval request screen used for requesting the approval for the software update, and cause the display device 70 to display a notification prompting a specific input operation, such as pressing of an approval button in the case where the user or the manager approves the request. Alternatively, in the approval request processing, the OTA master 30 can cause the display device 70 to display text, an icon, or the like, notifying that the update data of the software of the ECU 50a to 50d exists, or cause the display device 70 to display restrictions and the like during the execution of the software update processing. Upon receiving the input indicating that the request has been approved from the user or the manager, the OTA master 30 executes control processing of the above-described installation and activation, and updates the software of the target ECU.

Here, when a non-volatile memory of the ECU is a single-bank memory having one storage area (bank) used for storing a control program, update data, or the like, installation and activation are successively executed. Thus, the approval request processing for the software update is executed before the execution of the installation. When a non-volatile memory of the ECU is a dual-bank memory having two storage areas (banks) used for storing the control program, update data, or the like, the approval request processing for the software update is executed at least after the execution of the installation and before the execution of the activation. When the non-volatile memory of the ECU is a dual bank memory, the approval request processing for updating the software before the execution of the installation may be executed or omitted.

The software update processing is composed of a phase in which the OTA master 30 downloads the update data from the center 10 (a download phase), a phase in which the OTA master 30 transfers the downloaded update data to the target ECU and installs the update data in the storage area of the target ECU (an installation phase), and a phase in which the target ECU makes the installed update software version effective (an activation phase).

The download is processing in which the OTA master 30 receives the update data for updating the software of the ECUs 50a to 50d transmitted from the center 10 in the distribution package and stores the update data in the storage device 34. The download phase includes not only the execution of the download, but also control of a series of processes for the download, such as determining whether the download can be executed, an approval request for the download to the user or the manager of the vehicle, or verification of the update data.

The update data transmitted from the center 10 to the OTA master 30 may include any one of the update software (total data) of the ECU 50a to 50d, the difference data of the update software, the compressed data obtained by compressing the update software, and the divided data obtained by dividing the update software, the difference data, or the compressed data. Further, the update data may include an ECU_ID (or a serial number) of the target ECU and an ECU_Software_ID of the ECU before the update. The update data is downloaded as the above-described distribution package, but the distribution package includes the update data for a single ECU or a plurality of ECUs.

The installation is processing in which the OTA master 30 writes the update software (the updated version program) on the target ECU, based on the update data downloaded from the center 10. The installation phase includes not only the execution of the installation, but also control of a series of processes associated with the installation, such as determining whether the installation can be executed, an approval request for the installation to the user or the manager of the vehicle, transferring the update data, and verifying the update software.

When the update data includes the update software itself (total data), in the installation phase, the OTA master 30 transfers the update data (the update software) to the target ECU. Further, when the update data includes the compressed data of the update software, difference data, or divided data, the OTA master 30 may transfer the update data to the target ECU and the target ECU may generate the update software from the update data, or the OTA master 30 may generate the update software from the update data and then transfer the update software to the target ECU. Here, the update software can be generated by decompressing the compressed data or assembling (integrating) the difference data or the divided data.

The update software can be installed by the target ECU based on a request (or an instruction) for the installation from the OTA master 30 (or the center 10). Alternatively, the target ECU that has received the update data may autonomously execute the installation without receiving an explicit instruction from the OTA master 30.

The activation is processing in which the target ECU makes (activates) the installed update software effective. The activation phase includes not only the execution of the activation but also a series of control associated with the activation, such as determining whether the activation can be executed, an approval request for the activation to the user or the manager of the vehicle, and verifying the execution result.

The update software can be activated by the target ECU based on a request (or an instruction) for the activation from the OTA master 30 (or the center 10). Alternatively, the target ECU that has received the update data may autonomously activate after the completion of the installation without receiving an explicit instruction from the OTA master 30.

The software update processing can be executed continuously or in parallel to each of the ECUs.

Further, the "software update processing" in the present specification includes not only processing for continuously executing all of the download, installation, and activation, but also processing for executing only a part of the download, installation, and activation.

Processing

Next, processing executed in the network system according to the present embodiment will be described with further reference to FIGS. 8 to 12.

Figure 8:
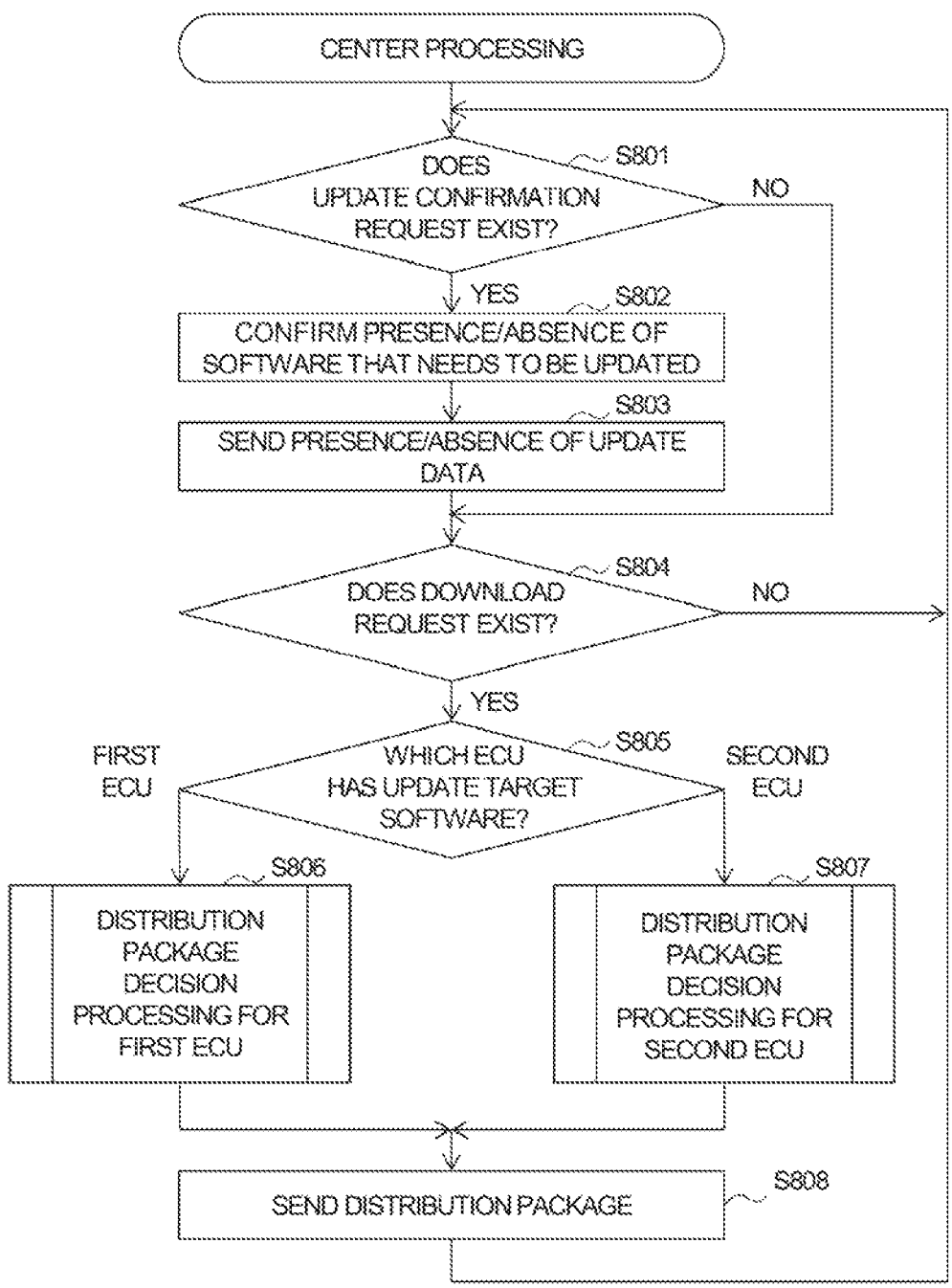
FIG. 8 is a flowchart of distribution control processing executed by the center.

FIG. 8 is a flowchart describing an example of distribution control processing executed by each constituent element of the center 10. The distribution control processing executed in FIG. 8 is started when the center 10 receives the update confirmation request transmitted by the OTA master 30.

(Step S801) The communication unit 16 determines whether the software update confirmation request from the OTA master 30 exists. When the update confirmation request exists (step S801, YES), the process proceeds to step S802, and when no update confirmation request exists (step S801, NO), the process proceeds to step S804.

(Step S802) The control unit 17 confirms the presence/absence of software that needs to be updated. The confirmation is executed based on the current version of the software of each of the ECUs 50a to 50d mounted on the vehicle and the latest version of each software stored in the storage unit 15. The current version of the software is acquired by the determination unit 18 from the vehicle configuration information included in the update confirmation request. When the presence/absence of software that needs to be updated is confirmed, the process proceeds to step S803.

(Step S803) The control unit 17 determines, based on the update management information stored in the storage unit 15, whether the software update data for the ECUs 50a to 50d mounted on the vehicle exists, and transmits, based on a determination result, information indicating the presence/absence of the updated data to the OTA master 30. The software update data is included in the update confirmation request. When the presence/absence of the update data is transmitted, the process proceeds to step S804.

(Step S804) The communication unit 16 determines whether a download request for the distribution package from the OTA master 30 exists. When a download request exists (step S804, YES), the process proceeds to step S805, and when no download request exists (step S804, NO), the process proceeds to step S801.

(Step S805) The control unit 17 determines whether the ECU having software that needs to be updated (hereinafter, referred to as "update target software") is one of the first ECUs of which the control functions need to be consistent with each other or one of the second ECUs of which the control functions do not need to be consistent with each other. When the ECU having the update target software is the first ECU (step S805, the first ECU), the process proceeds to step S806, and when the ECU having the update target software is the second ECU (step S805, the second ECU), the process proceeds to step S807.

(Step S806) The control unit 17 executes processing for deciding a distribution package of the software update data for the first ECU (distribution package decision processing for the first ECU). When the execution of the distribution package decision processing for the first ECU ends, the process proceeds to step S808.

(Step S807) The control unit 17 executes processing for deciding a distribution package of the software update data for the second ECU (distribution package decision processing for the second ECU). When the execution of the distribution package decision processing for the second ECU ends, the process proceeds to step S808.

(Step S808) The communication unit 16 transmits the distribution package decided by the control unit 17 to the OTA master 30. When the distribution package is transmitted, the process proceeds to step S801.

Figure 9:
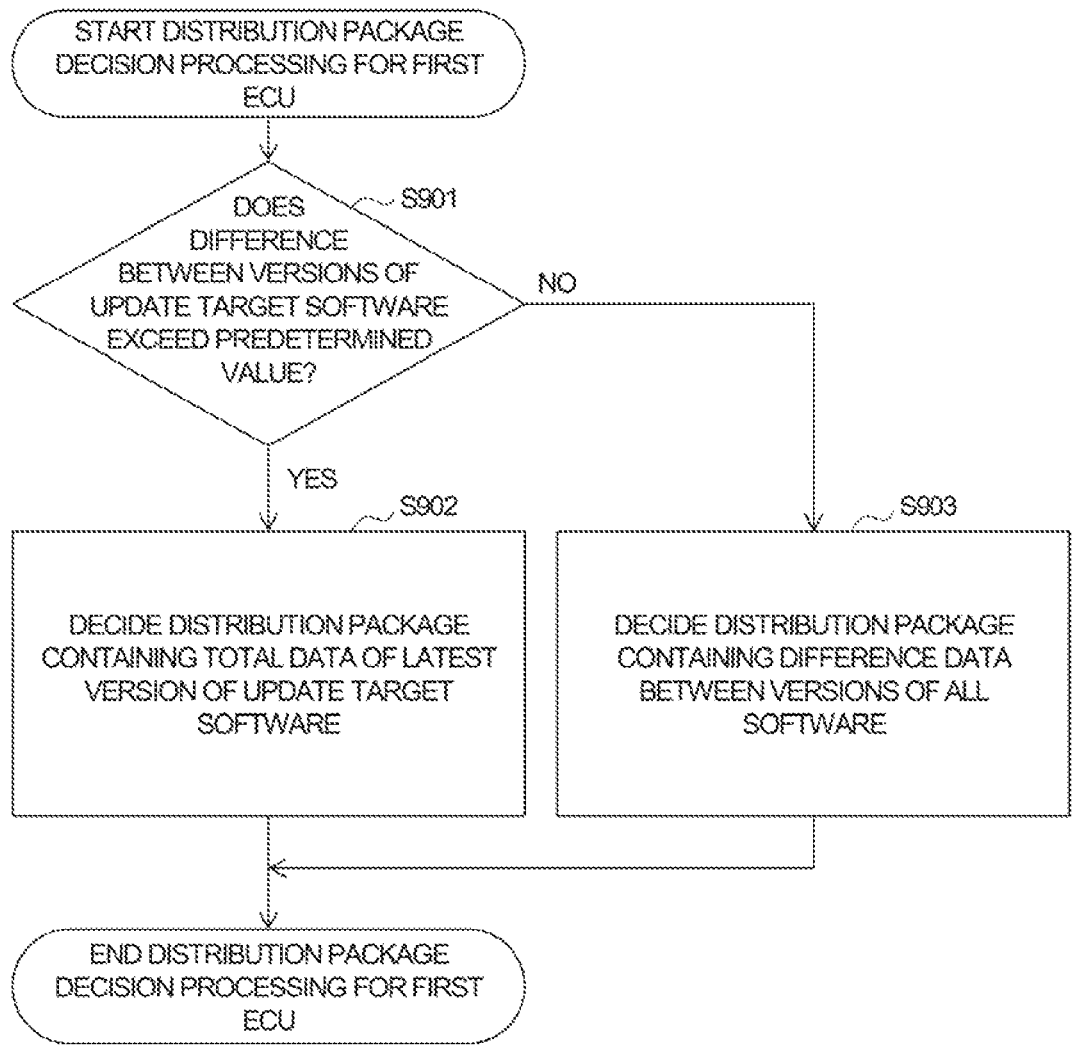
FIG. 9 is a flowchart of distribution package decision processing for a first ECU executed by the center.

With reference to FIG. 9, the distribution package decision processing for the first ECU illustrated in step S806 of FIG. 8 will be described. FIG. 9 is a flowchart describing an example of the distribution package decision processing for the first executed by the control unit 17 of the center 10.

(Step S901) The control unit 17 determines whether a difference between versions of the update target software exceeds a predetermined value. The difference between the versions of the update target software is a difference between the latest version of the software stored in the storage unit 15 and the current version of the software acquired from the vehicle. This determination is made to determine whether the current version of the software is significantly different from the latest version (whether the difference between the two versions is large). For example, when the latest version is 4.0 and the current version is 3.0, the difference of the software versions is 1.0. The predetermined value can be set based on update efficiencies and the like based on the data amount, an update time, or the like, in a case where the versions are upgraded at once using the total data and in a case where the versions are upgraded step by step using the difference data. When the difference between versions of the update target software exceeds the predetermined value (step S901, YES), the process proceeds to step S902, and when the difference between versions of the update target software is equal to or lower than the predetermined value (step S901, NO), the process proceeds to step S903.

(Step S902) The control unit 17 decides, as the distribution package, a package (that is, the total data package) containing at least total data of the latest version of the update target software. When the distribution package is decided, the distribution package decision processing for the first ECU ends.

(Step S903) The control unit 17 decides, as the distribution package, a package (that is, the difference data package) containing the difference data between versions each of all pieces of software of the first ECU. When the distribution package is decided, the distribution package decision processing for the first ECU ends.

Figure 11A:
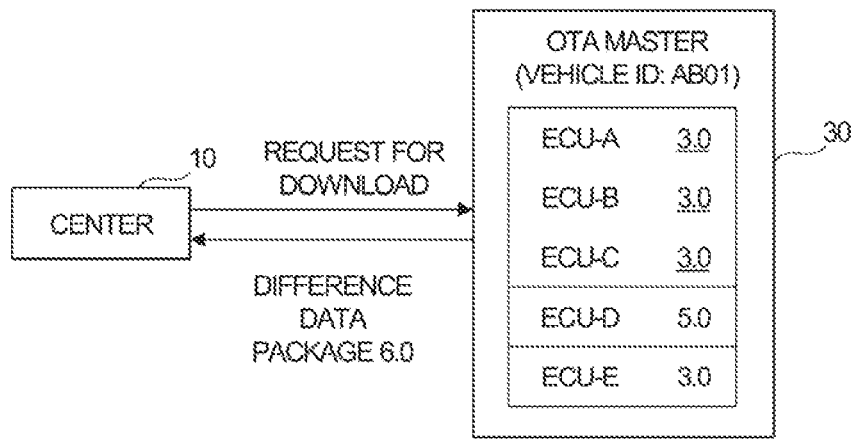
FIG. 11A is a specific example of distribution package decision processing for the first ECU.
Figure 11B:
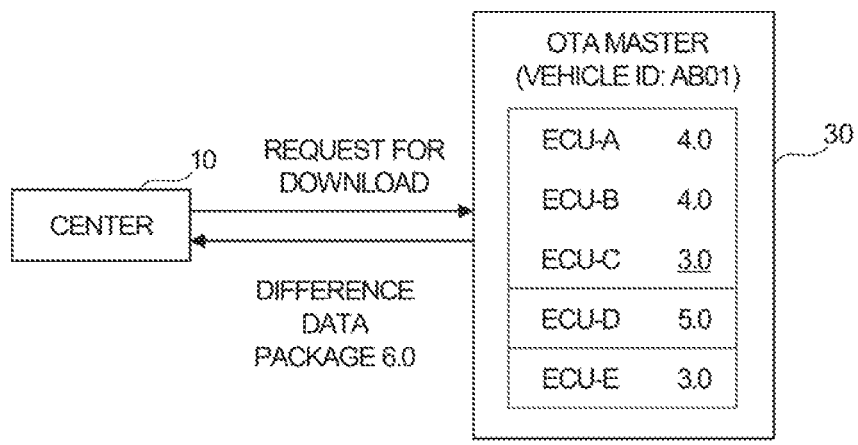
FIG. 11B is another specific example of the distribution package decision processing for the first ECU.
Figure 11C:
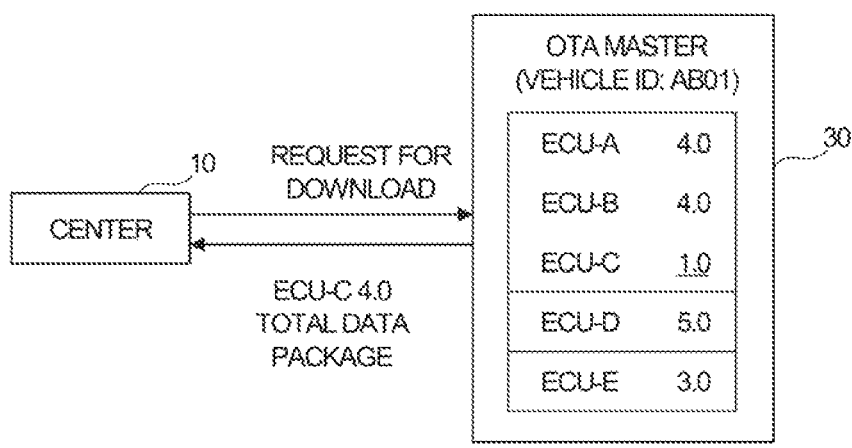
FIG. 11C is still another specific example of the distribution package decision processing for the first ECU.

Here, a specific example of the distribution package decision processing for the first ECU will be described with reference to FIGS. 6, 7A, 7B, and 11A to 11C. The predetermined value of the software version difference is 2.0. In FIG. 11A, the software version difference between the current version 3.0 of each piece of software of the first ECUs ECU-A, ECU-B, and ECU-C that need to be updated and the latest version 4.0 (see FIG. 6) does not exceed the predetermined value. Therefore, as a response to the download request, the center 10 transmits the difference data package 6.0 to the OTA master 30 as the distribution package. The difference data package 6.0 includes the difference data for updating each software of the first ECUs ECU-A, ECU-B, and ECU-C from version 3.0 to version 4.0 (see FIG. 7A). In FIG. 1113, the software version difference between the current version 3.0 of the first ECU ECU-C that needs to be updated and the latest version 4.0 does not exceed the predetermined value. Therefore, as a response to the download request, the center 10 transmits the difference data package 6.0 to the OTA master 30 as the distribution package. In FIG. 11C, the software version difference between the current version 1.0 for the first ECU ECU-C that needs to be updated and the latest version 4.0 exceeds the predetermined value. Therefore, as a response to the download request, the center 10 transmits total data packages of the latest version 4.0 of the software of the first ECU ECU-C (see FIG. 7B) to the OTA master 30 as distribution packages.

Figure 10:
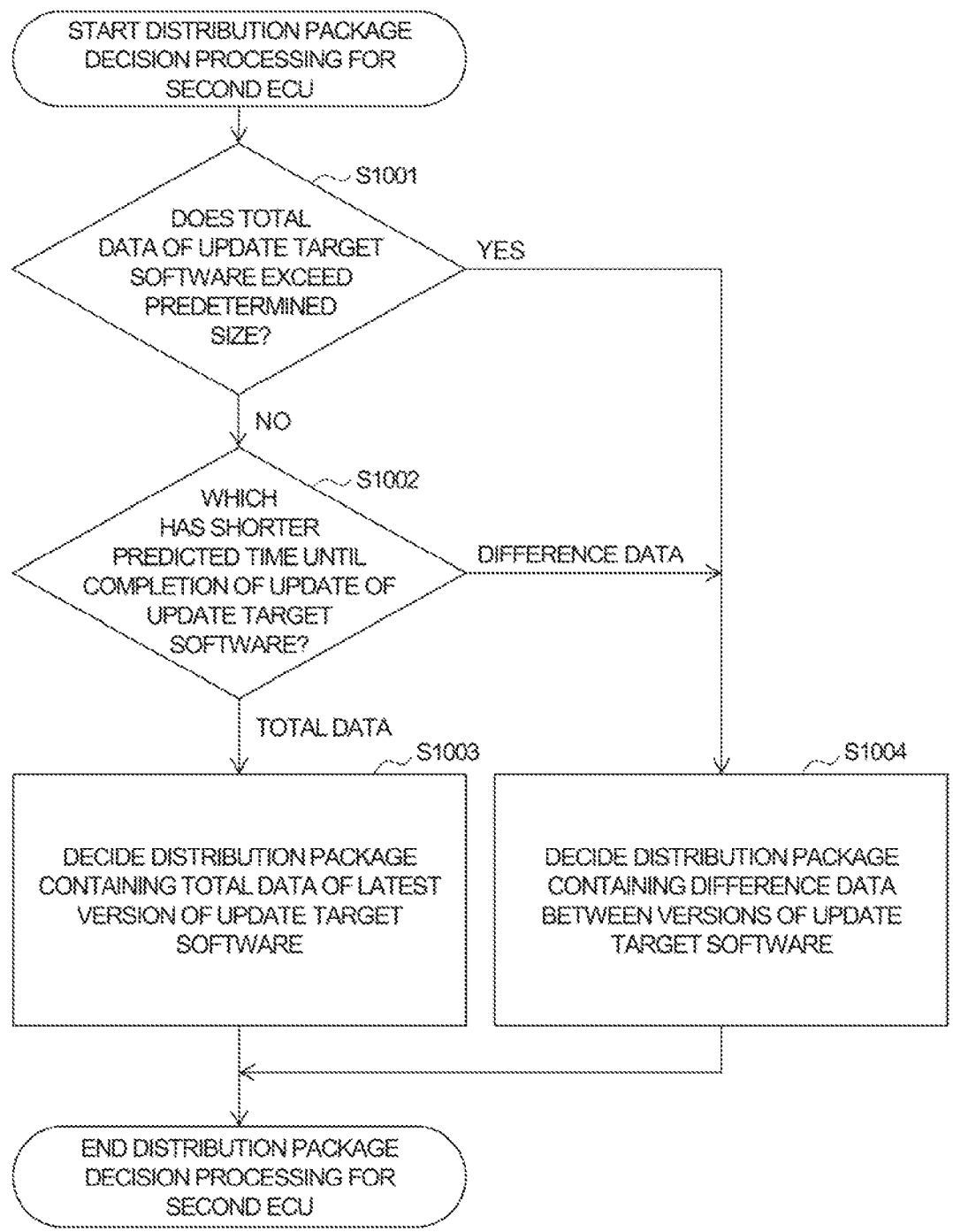
FIG. 10 is a flowchart of distribution package decision processing for a second ECU executed by the center.

Next, with reference to FIG. 10, the distribution package decision processing for the second ECU illustrated in step S807 of FIG. 8 will be described. FIG. 10 is a flowchart describing an example of the distribution package decision processing for the second ECUs executed by the control unit 17 of the center 10.

(Step S1001) The control unit 17 determines whether a size of total data of the update target software exceeds a predetermined size. The size (a data amount) of total data of the software is stored in advance in the storage unit 15 (see FIG. 7B), When a plurality of pieces of update target software exists, the size is a value obtained by integrating a plurality of all pieces of data. The predetermined size is a value which is set based on whether the vehicle can download total data of the update target software, and can be, for example, an arbitrary value equal to or smaller than a capacity of the data storage area usable for downloading in the storage unit 37 of the vehicle. When the size of the total data of the update target software exceeds the predetermined size (step S1001, YES), the process proceeds to step S1004, and when the size of total data of the update target software is equal to or smaller than the predetermined size (step S1001, NO), the process proceeds to step S1002.

(Step S1002) The control unit 17 determines which of the update processing using the total data or the update processing using the difference data has a shorter predicted time until the completion of the update of the update target software. The time until the completion of the software update can be predicted based on, for example, a degree of congestion of a communication band, the current version of the software, and a processing capacity of the ECU or the type of the non-volatile memory. When the update processing using total data has a shorter predicted time until the completion of the update of the update target software (step S1002, total data), the process proceeds to step S1003, and when the update processing using the difference data has a shorter predicted time until the completion of the update of the update target software (step S1002, difference data), the process proceeds to step S1004.

(Step S1003) The control unit 17 decides, as a distribution package, the package (that is, the total data package) containing at least total data of the latest version of the update target software. When the distribution package is decided, the distribution package decision processing for the second ECU ends.

(Step S1004) The control unit 17 decides, as the distribution package, a package (that is, the difference data package) containing at least the difference data between versions of the update target software. When the distribution package is decided, the distribution package decision processing for the second ECU) ends.

Figure 12A:
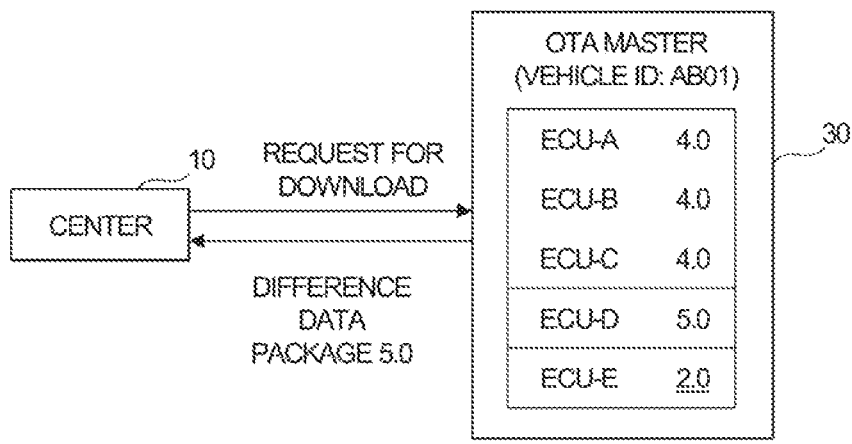
FIG. 12A is a specific example of distribution package decision processing for the second ECU.
Figure 12B:
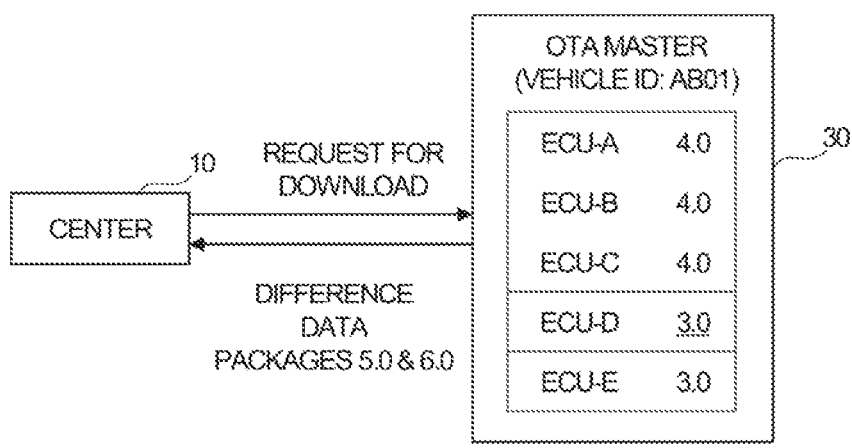
FIG. 12B is another specific example of the distribution package decision processing for the second ECU.
Figure 12C:
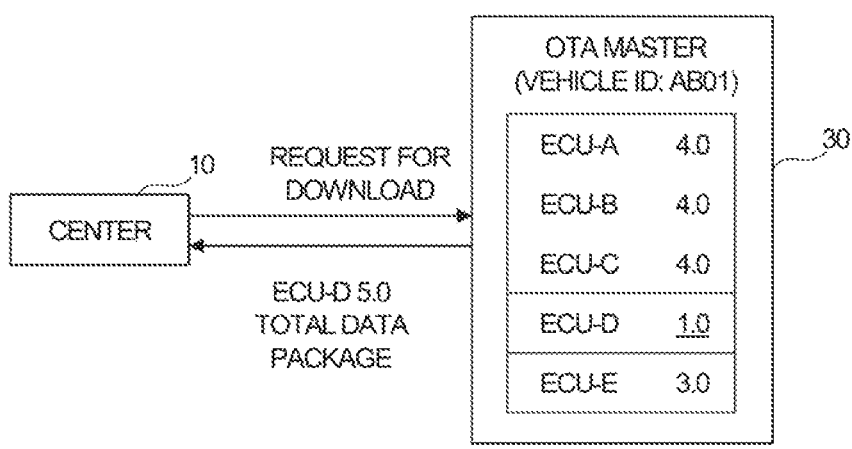
FIG. 12C is still another specific example of the distribution package decision processing for the second ECU.

Here, a specific example of the distribution package decision processing for the second ECU will be described with reference to FIGS. 6, 7A, 7B, and 12A to 12C. The predetermined size is assumed to be 550 MB. In FIG. 12A, total data, needed to upgrade the software of the second ECU ECU-E from the current version 2.0 to the latest version 3.0 (see FIG. 6), =600 MB (see FIG. 7B) exceeds the predetermined size. Therefore, as a response to the download request, the center 10 transmits the difference data package 5.0 having a size of 190 MB to the OTA master 30 as the distribution package. The difference data package 5.0 includes the difference data for updating the software of the second ECU ECU-E from version 2.0 to version 3.0 (see FIG. 7A). In FIG. 12B, total data, needed to upgrade the software of the second ECU ECU-D from the current version 3.0 to the latest version 5.0 (see FIG. 6), =540 MB (see FIG. 7B) is equal to or smaller than the predetermined size. Here, in this example, it is assumed that a method of updating the version of the difference data 3.0→4.0→5.0 step by step takes less time than a method of updating total data 3.0→5.0 at once. Therefore, in this assumption, as a response to the download request, the center 10 transmits the difference data packages 5.0 and 6.0 to the OTA master 30 as the distribution packages. The difference data package 5.0 and the difference data package 6.0 respectively include the difference data for updating the software of the second ECU ECU-D from version 3.0 to version 4.0, and the difference data for updating software from version 4.0 to version 5.0 (see FIG. 7A). In FIG. 12C, total data, needed to upgrade the software of the second ECU ECU-D from the current version 1.0 to the latest version 5.0, =540 MB is equal to or smaller than the predetermined size. Here, in this example, it is assumed that a method of updating total data 1.0→5.0 at once takes less time than a method of updating the version of the difference data 1.0→2.0→3.0→4.0→5.0 step by step. Therefore, in this assumption, as a response to the download request, the center 10 transmits the total data package (see FIG. 7B) of the latest package 5.0 of the software of the second ECU ECU-D to the OTA master 30 as the distribution package.

In the above embodiment, in step S805, it is described that the ECU having the update target software is either the first ECU or the second ECU. However, the software of the first ECU and the software of the second ECU can also be updated at the same time. In such a case, the distribution package decision processing for the first ECU (FIG. 9) and the distribution package decision processing for the second ECU (FIG. 10) are executed in parallel, and each extracted package is decided as one distribution package.

Figure 13:
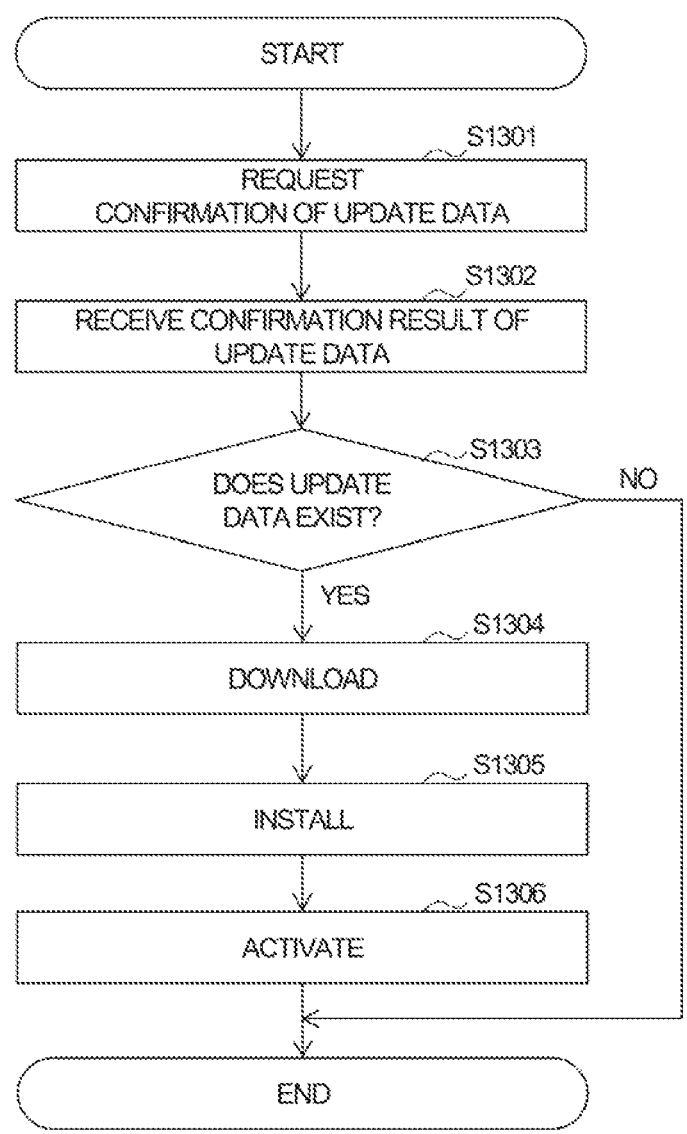
FIG. 13 is a flowchart of software update control processing executed by the OTA master.

FIG. 13 is a flowchart describing an example of the software update control processing executed by each constituent element of the OTA master 30. The software update control processing illustrated in FIG. 13 may be executed at, for example, the time of power ON of the vehicle.

(Step S1301) The communication unit 38 transmits a confirmation request for whether the software update data for the ECUs 50a to 50d exists to the center 10. The confirmation request includes the vehicle ID and the current versions of the pieces of the software of the ECUs 50a to 50d. When the confirmation request is transmitted to the center 10, the process proceeds to step S1302.

(Step S1302) The communication unit 38 receives the confirmation result of the confirmation request for the update data from the center 10. When the confirmation result is received, the process proceeds to step S1303.

(Step S1303) The control unit 39 determines, based on the confirmation result of the confirmation request for the update data received by the communication unit 38, whether the software update data for at least one of the ECUs 50a to 50d exists. When at least one piece of the software update data exists (step S1303, YES), the process proceeds to step S1304, and when no software update data exists (step S1303, NO), the software update control processing ends.

(Step S1304) The control unit 39 downloads the update data. In more detail, the communication unit 38 transmits the download request for the distribution package containing the update data to the center 10, and the communication unit 38 receives the distribution package transmitted from the center 10 in response to the download request. The communication unit 38 stores the received distribution package in the storage unit 37. When the data is downloaded, the process proceeds to step S1305.

(Step S1305) The control unit 39 executes the installation processing for the target ECU. In more detail, the control unit 39 transfers the update data included in the distribution package to the target ECU and instructs the target ECU to execute the installation. The target ECU writes the update data received from the OTA master 30 on the data storage area. When the installation processing is executed, the process proceeds to step S1306.

(Step S1306) The control unit 39 executes the activation processing for the target ECU. In more detail, the control unit 39 instructs the target ECU that has written the update data on the data storage area to activate the updated version of the software. The target ECU restarts and executes software after the update when a specific input operation, such as power OFF, is executed. When the activation processing is executed, the software update control processing ends.

Advantageous Effect

As described above, with the network system according to the embodiment of the present disclosure, as the update data, the center 10 stores in advance the package containing the difference data between versions each of pieces of software of the plurality of ECUs of which control functions need to be consistent with each other (the first ECUs) and the package containing total data of the latest version of the software of the ECU (the first ECUs and the second ECUs). Then, the center 10 dynamically changes package specifications of the update data of the software that needs to be updated based on the current versions of the pieces of the software of the ECUs 50a to 50d, mounted on the vehicle, received from the vehicle (the OTA master 30) and the latest version of the software stored in itself. As such, the degree of freedom in a distribution method of the update data can be improved, and it is possible to restrict worsening of the efficiency of the software update processing.

Further, as the distribution package, the center 10 suitably decides any one of the package containing the difference data between versions and the package containing total data of the latest version based on the version difference of software that needs to be updated, the amount of update data, the predicted time until the completion of the update, and the like. Therefore it is possible to effectively restrict worsening of the efficiency of the software update processing.

Although one embodiment of the technology of the present disclosure is described above, the present disclosure can be regarded not only as the center but also as the distribution control method executed by the center including the processor, the memory, and the storage device, the distribution control program, and the computer-readable non-transitory storage medium storing the distribution control program.

The technology of the present disclosure can be used in a network system used for updating software of an electronic control unit.

What is claimed is:

1. A center configured to distribute, to a vehicle, update data of software of a control device mounted on the vehicle, the center comprising
one or more processors configured to:
make a determination on whether to distribute, as the update data, update software or difference data between current software and the update software based on first information on the software of the control device mounted on the vehicle, wherein the one or more processors are configured to make the determination based on a version of the current software and a version of the update software; and transmit the determined update data to the vehicle.

2. The center according to claim 1, wherein the one or more processors are configured to:

acquire second information on the control device mounted on the vehicle;

determine, based on the second information, whether the update software is available for the control device; and transmit the determined update data to the vehicle upon determining that the update software is available for the control device.

3. The center according to claim 1, wherein the one or more processors are configured to make the determination based on a size of the update software.

4. The center according to claim 1, wherein the one or more processors are configured to make the determination based on a first predicted update time and a second predicted update time, the first predicted update time being an amount of time needed to update the current software to the update software by using the difference data, and the second predicted update time being an amount of time needed to update the current software to the update software by using the update software.

5. A system comprising:

a vehicle; and a center configured to distribute, to the vehicle, update data of software of a control device mounted on the vehicle, the center comprising one or more processors configured to:

make a determination on whether to distribute, as the update data, update software or difference data between current software and the update software based on first information on the software of the control device mounted on the vehicle, wherein the one or more processors are configured to make the determination based on a version of the current software and a version of the update software; and transmit the determined update data to the vehicle.

6. The system according to claim 5, wherein the one or more processors are configured to:

acquire second information on the control device mounted on the vehicle;

determine, based on the second information, whether the update software is available for the control device; and transmit the determined update data to the vehicle upon determining that the update software is available for the control device.

7. The system according to claim 5, wherein the one or more processors are configured to make the determination based on a size of the update software.

8. The system according to claim 5, wherein the one or more processors are configured to make the determination based on a first predicted update time and a second predicted update time, the first predicted update time being an amount of time needed to update the current software to the update software by using the difference data, and the second predicted update time being an amount of time needed to update the current software to the update software by using the update software.

9. A non-transitory storage medium storing a distribution control program which, when executed by a computer of a center that distributes, to a vehicle, update data of software of a control device mounted on the vehicle, causes the computer of the center to:

make a determination on whether to distribute, as the update data, update software or difference data between current software and the update software based on first information on the software of the control device mounted on the vehicle, wherein the computer is caused to make the determination based on a version of the current software and a version of the update software; and transmit the determined update data to the vehicle.

10. The non-transitory storage medium according to claim 9, wherein the distribution control program, when executed by the computer, further causes the computer to:

acquire second information on the control device mounted on the vehicle;

determine, based on the second information, whether the update software is available for the control device; and transmit the determined update data to the vehicle upon determining that the update software is available for the control device.

11. The non-transitory storage medium according to claim 9, wherein the computer is caused to make the determination based on a size of the update software.

12. The non-transitory storage medium according to claim 9, wherein the computer is caused to make the determination based on a first predicted update time and a second predicted update time, the first predicted update time being an amount of time needed to update the current software to the update software by using the difference data, and the second predicted update time being an amount of time needed to update the current software to the update software by using the update software.

* * * * *